Jan. 23, 1951  P. E. CHANEY ET AL  2,539,009
CYLINDRICAL RECORDING CHART CONSTRUCTION
Filed Oct. 26, 1945

WITNESS:
Rob't R. Kitchel

INVENTORS
Preston E. Chaney &
William E. Barnes
BY
Busser and Harding
ATTORNEYS.

Patented Jan. 23, 1951

2,539,009

UNITED STATES PATENT OFFICE 2,539,009

CYLINDRICAL RECORDING CHART CONSTRUCTION

Preston E. Chaney and William E. Barnes, Beaumont, Tex., assignors to Sun Oil Company, Philadelphia, Pa., a corporation of New Jersey Application October 26, 1945, Serial No. 624,814

3 Claims. (Cl. 346—138)

This invention relates to a tube calipering device of the type which is passed through tubing to be examined such as oil well tubing and which will indicate and record variations of internal diameter or internal surface configurations of the tubing on a suitable recording surface. More particularly this invention relates to improvements in the recording chart mechanism and chart surface on which the calipering record is effected. The invention is adapted particularly for use with calipering and recording devices such as are described in our co-pending applications for Calipering and Recording Mechanism, Serial Number 624,811, now Patent 2,518,663, Recording Stylus Actuating Mechanism, Serial Number 624,812, now abandoned, and Driving and Recording Mechanism for Calipering Device, Serial Number 624,813, filed of even date herewith.

Our co-pending applications relate to well tubing, calipering and recording devices having a plurality of feelers or indicators, positioned on a housing, which are arranged to be resiliently urged outward in a manner to maintain contact with the inner walls of the tubing under examination and which function as a group to center the device within the tubing and also function individually to indicate localized variations in the internal surface configuration. These calipering devices referred to are mechanically operated and completely self-contained adapting them for use particularly with tubing containing oil or other fluids under high pressure.

It is a principal object of this invention to provide a recording chart mechanism having an oil and water resistant recording chart surface which is readily usable with such calipering and recording devices for effecting a continuous spiral record vertical deviations from which are indicative of variations in surface configuration.

It is a further object of this invention to utilize a recording surface which is adapted to be maintained in cylindrical shape during use.

Further objects and advantages of this invention will be apparent by reference to the following specification and drawings in which.

Figure 1:
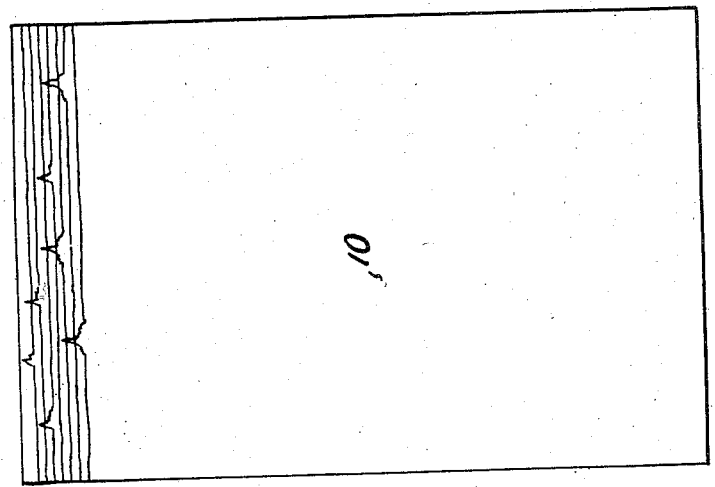
Figure 1 is a developed view of the recording chart having at its top a lined area to indicate a partial recording.
Figure 2:
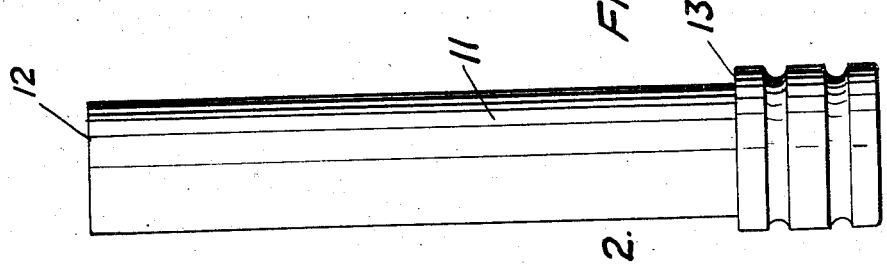
Figure 2 is an elevation of the device used for rolling and inserting the recording chart into a hollow cylinder.

Referring to the drawings, the recording chart 10 is formed of a thin foil which may be of any desired metal, such as copper, aluminum, brass, etc. and will be sufficiently long so that when rolled onto the insertion plug 11 in order to form the sheet into a tube or cylinder of desired diameter its length will be such that one end of the formed cylinder or tube will extend beyond the upper end 12 of the insertion plug and its other end will be positioned on the shoulder 13 of the plug. The surface of the sheet 10 will be coated preferably with any type of oil- and water-resistant material, such as certain types of die-makers layout ink, which preferably will be of a color contrasting with the color of the metal from which the sheet is formed, in order to produce well defined markings when the surface is etched, as for example by a stylus. The coating should be such that when it is etched it will not be subject to flaking.

Figure 3:
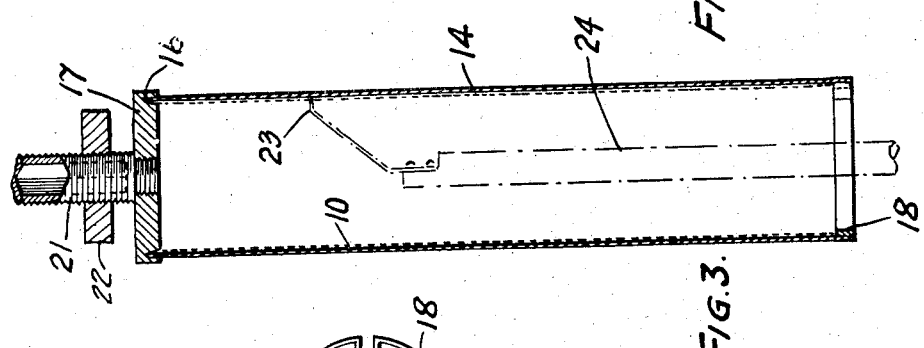
Figure 3 is a longitudinal section of the assembled recording mechanism including the chart in cylindrical form and inserted in the chart chamber.
Figure 4:
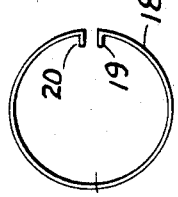
Figure 4 is a view of a detail of the invention.

As shown in Figure 3, a chart chamber is provided comprising a hollow cylinder 14 and end wall 17 having groove 16 for receiving one end of the cylinder. Groove 16 preferably is designed so as to provide a shrink fit for securing end wall 17 to cylinder 14 and has a tapered surface on its inner side to form a recess with the end of the cylinder 14 to receive the end of the recording chart 10. In forming the recording chart the sheet 10 will be positioned on the insertion plug 11 with its coated surface contacting the plug and its longitudinal edges abutting. Then the upper edge of the formed chart which extends beyond the upper end of the plug is inserted into the recess of the circumferential groove 16 and the insertion plug 11 is then withdrawn leaving the recording chart 10 (shown in dotted lines) adjacent the inner surface of cylinder 14. The spring retaining ring 18 shown in detail in Figure 4 is positioned within the formed cylinder at its lower end by forcing the ends 19 and 20 together to contract the spring sufficiently to be received by the cylinder. The spring ring 18 will be so positioned within the cylinder that its ends 19 and 20 are disposed at points removed from the abutting longitudinal edges of the chart and the ring will function to brace the chart at its lower end and to maintain it in rigid cylindrical form.

The cylinder 14 is rotated by means of a shaft 21 which in turn is rotated through fixed nut 22, for example, by the means shown and described in our applications for calipering and recording devices, Serial Numbers 624,811 and 624,813, filed of even date herewith. Also as shown in these applications a stylus 23 is positioned within and in cooperative recording relation with the cylindrical recording chart and means are provided to actuate the stylus in a longitudinal direction through a shaft 24 in accordance with variations in internal surface configurations of tubing which is being examined, thus effecting a record of the variations. It may be seen that rotation of shaft 21 causes the chart chamber together with chart 10 to rotate and at the same time imparts a longitudinal movement with respect to the stylus, thereby producing a helical line on chart 10. Variations in surface configuration of the tubing being calipered will result in angular deviations of the line from a true helix.

At the top of Figure 1 are shown several equidistantly spaced lines to indicate how the recording made by the stylus appears on the chart after the record has been made and the chart removed from the housing and flattened for inspection. It will be understood from our co-pending applications that the chart chamber is positioned centrally of a housing which contains at one end the means for rotating the chart chamber and at its other end is provided the actuating means for the stylus which cooperates with the chart in effecting a record. The housing for these various members is of substantial length and is made separable at several places by providing threaded joints. After a record has been made, the housing is separated at a joint provided near the bottom of the chart chamber and the chart is released for taking out of the chamber by simply removing the retainer spring 18. The chart is withdrawn and opened to its original flat shape. The provision of a cylindrical chart provides a record which may, when the calipering record is being made, occupy a relatively small space in the calipering mechanism and yet provides a chart with lines of substantial length. The mechanisms for effecting the record can be such as to produce a record of exceedingly closely spaced lines and the record can, of course, be enlarged for inspection.

Since the complete calipering and recording device is designed particularly for calipering deep oil and gas wells as of 10 to 15 thousand feet in depth, the mechanism which actuates the stylus is arranged to produce on the record an indication of each tube length that has been calipered. This is done by taking advantage of the fact that the tubes are usually joined by outside couplings and hence a space which is equal to the thickness of the tubes will be encountered at intervals corresponding to the tubing couplings. In other words, the recording stylus would indicate on the chart at regular intervals angular deviations of equivalent magnitude and from these deviations can be determined the number of lengths of tubing calipered by the device.

Having described our invention, what we claim and desire to protect by Letters Patent is:

1. In combination with measurement-recording apparatus having a chamber for the reception of a recording chart and a cooperating stylus, a pliable recording chart, a cap member having a generally circular groove therein for receiving and closing one end of the chart when it is formed into cylindrical shape, spring means at the other end of the chart for cooperating with the cap member to maintain the chart in cylindrical shape and provide an open end for the reception of the stylus, said chart when it is formed into cylindrical shape having an inner surface which is adapted to be etched by the stylus.

2. In combination with measurement-recording apparatus having a chamber for the reception of a recording chart and a cooperating stylus, a pliable recording chart, a cap member having a generally circular groove therein for receiving and closing one end of the chart when it is formed into cylindrical shape, spring means at the other end of the chart for cooperating with the cap member to maintain the chart in cylindrical shape and provide an open end, said chart when it is formed into cylindrical shape having on its inner surface an etchable material, said stylus extending through the open end of the chart and positioned within the chart and in contact with its inner surface and thus adapted to etch the surface when the chart is actuated.

3. In combination with measurement-recording apparatus having a chamber for the reception of a recording chart and a cooperating stylus, a pliable recording chart, a cap member having a generally circular groove therein for receiving and closing one end of the chart when it is formed into cylindrical shape, spring means at the other end of the chart for cooperating with the cap member to maintain the chart in cylindrical shape and provide an open end, said chart when it is formed into cylindrical shape having on its inner surface an etchable material, said stylus extending through the open end of the chart and positioned within the chart and in contact with its inner surface and thus adapted to etch the surface when the chart is actuated, and means secured to said cap member for actuating the chart.

PRESTON E. CHANEY.
WILLIAM E. BARNES.

REFERENCES CITED

The following references are of record in the file of this patent:

UNITED STATES PATENTS

| Number | Name | Date |
| --- | --- | --- |
| 222,292 | Luders | Dec. 2, 1879 |
| 526,383 | Dale | Sept. 25, 1894 |
| 622,795 | Dean | Apr. 11, 1899 |
| 666,154 | Reed | Jan. 15, 1901 |
| 680,145 | Hawley | Aug. 6, 1901 |
| 1,052,940 | Morris | Feb. 11, 1913 |
| 1,235,260 | Tubesing | July 31, 1917 |
| 1,275,605 | Royer | Aug. 13, 1918 |
| 1,409,304 | Loomis | Mar. 14, 1922 |
| 1,466,380 | Nusbaum | Aug. 28, 1923 |
| 1,837,222 | Kannenstine | Dec. 22, 1931 |
| 2,078,623 | Wilde, Jr. | Apr. 27, 1937 |
| 2,102,080 | Kinley | Dec. 14, 1937 |
| 2,135,538 | Sherman | Nov. 8, 1938 |
| 2,153,917 | Exline | Apr. 11, 1939 |
| 2,223,913 | Johnston | Dec. 3, 1940 |
| 2,322,343 | Brandon | June 22, 1943 |